(12) United States Patent
Bootsma, Jr.

(10) Patent No.: US 10,495,064 B2
(45) Date of Patent: Dec. 3, 2019

(54) ARTICULATING SOLAR ENERGY AND WIND POWER HARVESTING APPARATUS

(71) Applicant: Pieter Bootsma, Jr., Oakland Gardens, NY (US)

(72) Inventor: Pieter Bootsma, Jr., Oakland Gardens, NY (US)

( * ) Notice: Subject to any disclaimer, the term of this patent is extended or adjusted under 35 U.S.C. 154(b) by 129 days.

(21) Appl. No.: 15/888,698

(22) Filed: Feb. 5, 2018

(65) Prior Publication Data
US 2018/0223810 A1 Aug. 9, 2018

Related U.S. Application Data

(60) Provisional application No. 62/454,732, filed on Feb. 4, 2017.

(51) Int. Cl.
*F03D 9/25* (2016.01)
*F03D 7/06* (2006.01)
(Continued)

(52) U.S. Cl.
CPC .............. *F03D 9/25* (2016.05); *F03D 3/062* (2013.01); *F03D 7/06* (2013.01); *F03D 9/007* (2013.01); *F03G 6/068* (2013.01); *F24S 20/20* (2018.05); *F24S 20/61* (2018.05); *F24S 23/30* (2018.05); *F24S 30/48* (2018.05); *H02S 10/12* (2014.12); *H02S 20/32* (2014.12); *H02S 40/22* (2014.12); *F05B 2220/706* (2013.01); *F05B 2220/708* (2013.01); *F05B 2240/913* (2013.01); *Y02E 10/465* (2013.01); *Y02E 10/52* (2013.01); *Y02E 10/728* (2013.01); *Y02E 10/74* (2013.01)

(58) Field of Classification Search
CPC . F03D 3/062; F03D 7/06; F03D 9/007; F03D 9/25; F03G 6/068; F05B 2220/706; F05B 2220/708; F05B 2240/913; F24S 20/20; F24S 20/61; F24S 23/30; F24S 30/48; H02S 10/12; H02S 20/32; H02S 40/22; Y02E 10/465; Y02E 10/52; Y02E 10/728; Y02E 10/74

See application file for complete search history.

(56) References Cited

U.S. PATENT DOCUMENTS 4,043,317 A   8/1977   Scharfman
4,229,941 A   10/1980  Hope
(Continued)

*Primary Examiner* — Jesse S Bogue
(74) *Attorney, Agent, or Firm* — Vincent G. LoTempio; Kloss, Stenger & LoTempio; David T. Stephenson

(57) ABSTRACT

An articulating solar energy and wind power harvesting apparatus optimizes harnessing of solar energy and wind power by rotatably and pivotally articulating a solar thermal collector plate to track the sun, and air foils to follow the changing direction of the wind. The air foils also directionally funnel wind to cool a heat exchange system and the solar thermal collector plate. The solar thermal collector plate captures solar radiation for conversion to electricity. A solar lens directs the solar radiation towards the solar thermal collector plate. Air foils are disposed in a radial, spaced-apart relationship around the solar thermal collector plate, pivoting up to 90° to optimize capture of wind. The solar thermal collector plate and the air foils are controllably articulated up to 360° about a vertical plane, and up to 180° about a horizontal plane to optimize capture of solar radiation and wind.

20 Claims, 6 Drawing Sheets

(51) Int. Cl.
*F03D 3/06* (2006.01)
*F03G 6/06* (2006.01)
*H02S 10/12* (2014.01)
*H02S 40/22* (2014.01)
*F24S 20/61* (2018.01)
*F03D 9/00* (2016.01)
*F24S 30/48* (2018.01)
*F24S 20/20* (2018.01)
*F24S 23/30* (2018.01)
*H02S 20/32* (2014.01)

(56) References Cited

U.S. PATENT DOCUMENTS

| | | | | |
|---|---|---|---|---|
| 4,551,631 A | * | 11/1985 | Trigilio | F03D 3/0409 |
| | | | | 290/55 |
| 6,661,113 B1 | * | 12/2003 | Bonin | F03D 9/007 |
| | | | | 290/55 |
| 7,851,935 B2 | * | 12/2010 | Tsao | F03D 3/00 |
| | | | | 290/44 |
| 7,937,955 B2 | * | 5/2011 | Tsao | F03G 6/068 |
| | | | | 62/6 |
| 8,338,977 B2 | * | 12/2012 | Lee | F03D 9/00 |
| | | | | 290/44 |
| 8,354,757 B2 | * | 1/2013 | Lee | F03D 9/00 |
| | | | | 290/44 |
| 8,378,621 B2 | | 2/2013 | Singhal et al. | |
| 9,416,774 B2 | * | 8/2016 | Jordan, Sr. | F03D 3/061 |
| 9,638,170 B2 | * | 5/2017 | Lee | F03D 7/026 |
| 9,657,714 B2 | | 5/2017 | Blaize | |
| 2010/0219643 A1 | * | 9/2010 | Biucchi | F03D 3/0427 |
| | | | | 290/55 |

* cited by examiner

ARTICULATING SOLAR ENERGY AND WIND POWER HARVESTING APPARATUS

CROSS REFERENCE OF RELATED APPLICATIONS

This application claims the benefits of U.S. provisional application No. 62/454,732, filed Feb. 4, 2017 and entitled A DEVICE FOR HARNESSING WIND AND SOLAR ENERGY SIMULTANEOUSLY AND CONVERTING IT TO ELECTRICAL ENERGY, which provisional application is incorporated by reference herein in its entirety.

FIELD OF THE INVENTION

The present invention relates generally to an articulating solar energy and wind power harvesting apparatus. More so, the present invention relates to a harvesting apparatus that optimizes the harnessing of solar energy and wind power by rotatably and pivotally articulating a solar thermal collector plate to track the sun, and air foils to follow the changing direction and speed of the wind, while also directionally funneling the wind power captured by the air foils to cool the solar thermal collector plate; whereby the apparatus provides a base portion that is carried by a ball joint that enables rotational and pivotal articulation of the base portion up to 360° about a vertical plane and up to 180° about a horizontal plane; whereby a solar thermal collector plate is disposed on the base portion for capturing solar radiation and converting the solar radiation to electricity; whereby a solar lens is disposed in a parallel, spaced-apart relationship from the solar thermal collector plate to direct solar radiation towards the solar thermal collector plate; and whereby a plurality of air foils are hingedly connected in a radial, spaced-apart relationship around the peripheral region of the base portion, and pivotal up to 90° in relation to the base portion, so as to capture the wind and forcibly rotate the air foils to create mechanical power with a generator, and funneling the wind towards the solar thermal collector plate for cooling.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

It is known in the art that solar energy is a type of clean energy source that can be converted to produce electricity. Yet, the output of a solar power converter also relies heavily on weather conditions. For instance, many solar panels are designed to only convert solar energy during sunny daylight hours. They do not produce significant amount of energy during cloudy days or nighttime. Wind energy is another renewable energy that can be converted into electricity. It has emerged as the fastest growing source of energy, presenting a clean, renewable, and ecology-friendly alternative to traditional fossil-based energy supplies. However, due to seasonal and daily variations in wind speed, the output of a wind energy converter often fluctuates.

It is also known that the ability to harness wind energy and convert it to mechanical energy to perform work as in generating electricity via an electrical generator was achieved decades ago. The ability to harness solar energy either via optical concentrators to achieve thermal concentrations of heated elements and utilize the converted energy into work, or utilize the direct sun light converted in solar panels to create electricity has been viable for decades too.

Current wind farms in any geographic location are dormant during the solar maximum of the day with no ability to harness the suns energy. Likewise, solar farms during a windy night cannot harness the wind energy for electrical production. Attempting to combine both into a twenty four hour solution has its hurdles in the form of available sun light and inconsistent wind patterns at any time during a twenty four period. However the singular use of one or the other is inefficient when there is no solar or wind energy to harness.

Further, limited areas of land make combining solar and wind farms technically challenging and geographic landscapes prevent either, or both, green energy solutions due to composition of the earth and difficult terrain. By combining the ability into one single medium, it effectively increases the probability of one, or the other, and or, both mediums collecting and converting the energy into electricity during a twenty-four hour period, thus raising the efficiency of electrical production.

Other proposals have involved harnessing solar radiation energy and wind power generation. The problem with these energy producing systems is that they do not create a synergy for optimal generation of electricity. Also, the solar panels can overheat. Even though the above cited energy producing systems meet some of the needs of the market, an articulating solar energy and wind power harvesting apparatus that optimizes the harnessing of solar energy and wind power by rotatably and pivotally articulating a solar thermal collector plate to track the sun, and air foils to follow the changing direction and speed of the wind, while also directionally funneling the wind power captured by the air foils to cool the solar thermal collector plate is still desired.

SUMMARY

Illustrative embodiments of the disclosure are generally directed to an articulating solar energy and wind power harvesting apparatus. The articulating solar energy and wind power harvesting apparatus serves to optimize the harnessing of solar energy and wind power by rotatably and pivotally articulating a solar thermal collector plate to track the sun, and air foils to follow the changing direction and speed of the wind, while also directionally funneling the wind power captured by the air foils to cool the solar thermal collector plate. The apparatus is also effective in directionally funneling the wind captured by the air foils to cool the solar thermal collector plate.

In some embodiments, the apparatus may include a base portion. The base portion is carried by a ball joint that enables rotational and pivotal articulation of the base portion up to 360° about a vertical plane, and up to 180° about a horizontal plane. A solar thermal collector plate is disposed on the base portion. The solar thermal collector plate captures solar radiation, and converts the solar radiation to electricity. A solar lens is disposed in a parallel, spaced-apart relationship from the solar thermal collector plate. The solar lens directs the solar radiation towards the solar thermal collector plate.

In some embodiments, the apparatus may include a plurality of air foils. The air foils are disposed in a radial, spaced-apart relationship around the peripheral region of the base portion. The air foils are arranged around the peripheral region of the base portion in a radial, angled relationship.

The air foils are hingedly connected to the peripheral region of the base portion, so as to be pivotal up to 90° in relation to the base portion. Both the solar thermal collector plate and the air foils are controllably articulated up to 360° about a vertical plane, and up to 180° about a horizontal plane to optimize capture of solar radiation and wind.

This articulation optimizes capture of the wind to create wind power. The wind forcibly rotates the air foils about the base portion to create mechanical power with a connected generator. The radial, angled arrangement of the air foils is also configured to funnel the wind towards the solar thermal collector plate for cooling thereof. A cable carries the generated electricity from the solar thermal collector plate and the generator for consumption. A pole carries the weight of the base portion, solar thermal collector plate, and air foils.

One objective of the present invention is to combine the capture of solar radiation and wind power in a single harvesting apparatus to optimize the generation of electricity.

Another objective is to pivotally and rotatably articulate the solar thermal collector plate to track the sun.

Yet another objective is to pivotally and rotatably articulate the air foils collector plate to track the changing wind direction.

Yet another objective is to provide a heat exchange system for cooling the solar thermal collector plate.

Yet another objective is to funnel wind through the air foils to cool the solar thermal collector plate and the heat exchange system.

Yet another objective is to track the position of the sun, so as to articulate the solar thermal collector plate in the direction of the sun, and thereby optimize capture of solar radiation.

Yet another objective is to remotely control the articulation of the solar thermal collector plate and the air foils.

Yet another objective is to provide an inexpensive to manufacture articulating solar energy and wind power harvesting apparatus.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

Figure 1:
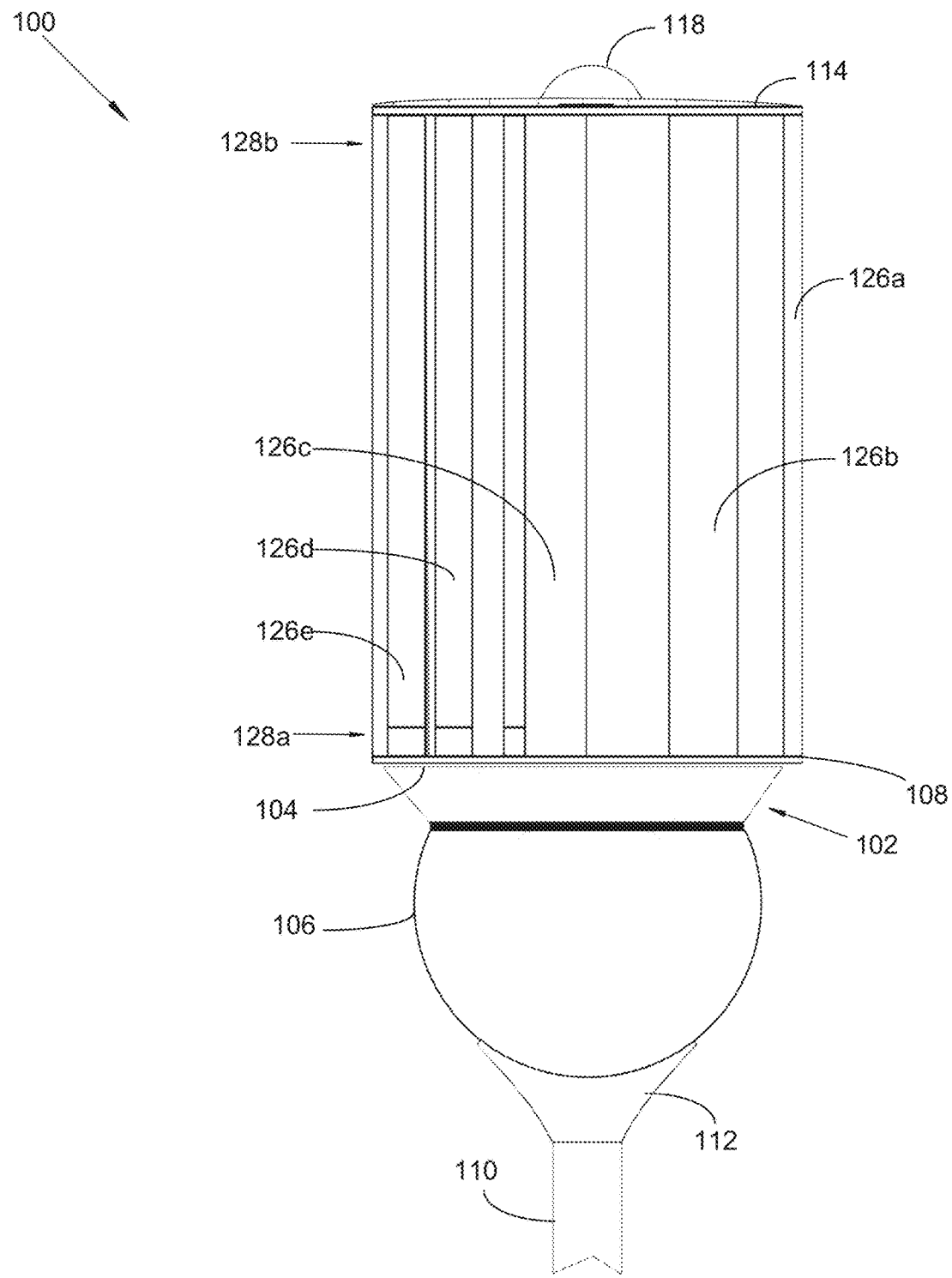
FIG. 1 illustrates a perspective view of an exemplary articulating solar energy and wind power harvesting apparatus, in accordance with an embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

An articulating solar energy and wind power harvesting apparatus 100 is referenced in FIGS. 1-6. Articulating solar energy and wind power harvesting apparatus 100, hereafter "apparatus 100" is configured to create a synergy between energy from solar radiation 214 and wind power 216, so as to optimize the harnessing of electricity. Specifically, apparatus 100 works to harness solar energy and wind power, creating a twenty-four hour solution for generating electricity by concentrating solar radiation 214 when the sun is visible, and capturing wind energy in daylight, night time hours, and when the sun is not visible.

In some embodiments, apparatus 100 harnesses energy from solar radiation 214 by rotatably and pivotally articulating a solar lens 118 and a solar thermal collector plate 208 to track the sun, and air foils 126a-e to maximize capture of solar radiation 214. Apparatus also harnesses wind power by rotatably and pivotally articulating air foils 126a-e to maximize capture of the wind. The apparatus 100 is also effective in directionally funneling the wind 600 captured by the air foils 126a-e to cool a heat exchange system 206 and the solar thermal collector plate 208.

As referenced in FIG. 1, apparatus 100 comprises a base portion 102. Base portion 102 provides the supportive framework for a solar thermal collector plate 208, a lens, and a plurality of air foils 126*a-e*, as described below. In one non-limiting embodiment, base portion 102 is defined by a generally annular shape. Though other shapes and dimensions may be used in other embodiments.

In some embodiments, a pole 110 may be used to carry the weight of the base portion 102, and other components, such as a solar thermal collector plate 208, and a plurality of air foils 126*a-e*. Pole 110 may be fixedly attached to a ground surface in a generally perpendicular orientation. Pole 110 may be rigid, or partially flexible to allow for swaying when the wind blows against apparatus 100.

Figure 5:
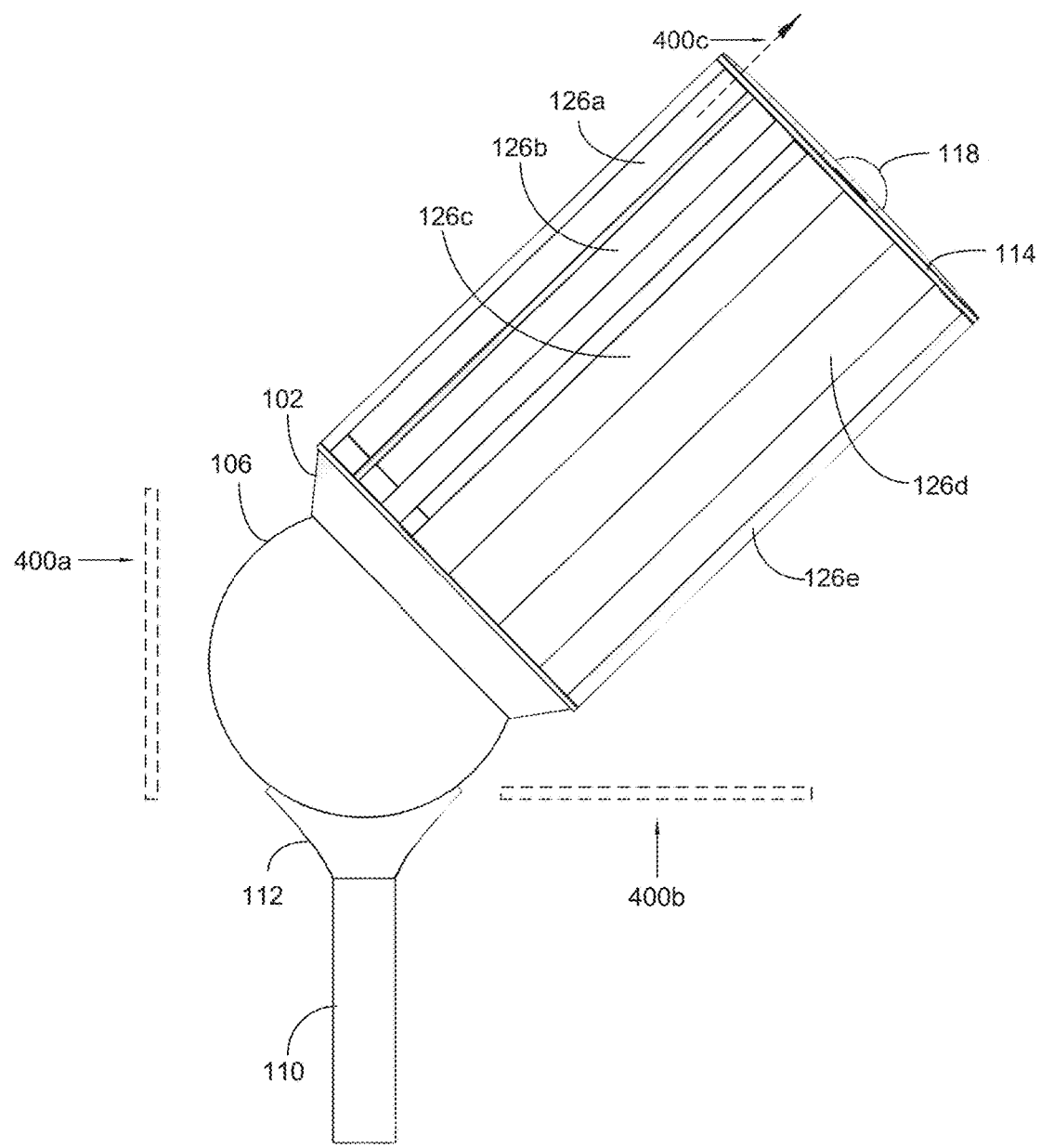
FIG. 5 illustrates a sectioned view of the articulating solar energy and wind power harvesting apparatus shown in FIG. 1, showing a vertical plane, a horizontal plane about which the ball joint articulates, and a longitudinal air foil axis about which the air foil rotates, in accordance with an embodiment of the present invention.

Looking ahead to FIG. 5, base portion 102 is carried by a ball joint 106 that rotatably and pivotally articulates. Ball joint 106 enables base portion 102 to articulate in a rotational and pivotal direction up to 360° about a vertical plane 108*a*, and up to 180° about a horizontal plane 108*b*. In one embodiment, horizontal plane 108*b* is disposed generally parallel to a ground surface on which apparatus 100 rests. In another embodiment, vertical plane 108*a* is disposed generally perpendicular to ground surface.

Base portion 102 is rotatably and pivotally by ball joint 106 in relation to the horizontal and vertical plane 108*a*, and within the described parameters. This articulation allows solar thermal collector plate 208, a solar lens 118, and a plurality of air foils 126*a-e* to optimize capture of solar radiation 214 and the wind from any direction, i.e., tracking of sun and following changing wind directions. Thus, the ball joint 106 is configured to rotate and pivot the base portion 102, for tracking both the sun and the wind.

Figure 2:
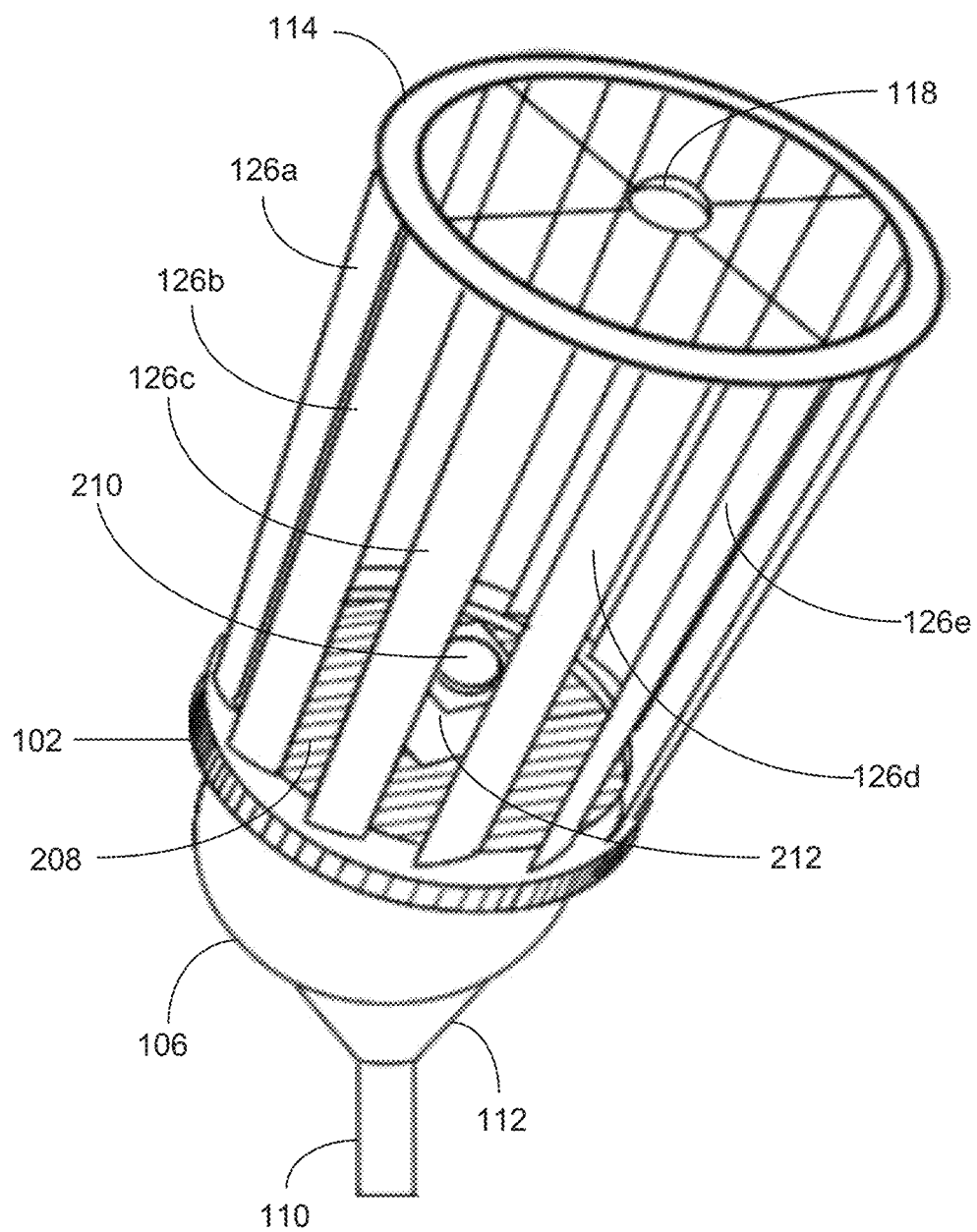
FIG. 2 illustrates a perspective view of the articulating solar energy and wind power harvesting apparatus shown in FIG. 1, showing the base portion pivoting to a 45° orientation, in accordance with an embodiment of the present invention.

As FIG. 2 illustrates, ball joint 106 is controlled to rotate and pivot the orientation of base portion 102 in synchronization with the sun. Those skilled in the art will recognize that the sun travels through 360° east to west per day, but from the perspective of any fixed location the visible portion is 180° during an average half day period. This creates a situation in which capturing the optimal solar radiation 214. Further, the wind may change directions and blow from any of 360° relative to the apparatus 100. A mechanical controller (not shown) known in the art may be used to control the rotational and pivotal articulation. Mechanical controller may be remotely controlled, or programmed to follow a predetermined articulation pattern for tracking the sun and wind.

Figure 3:
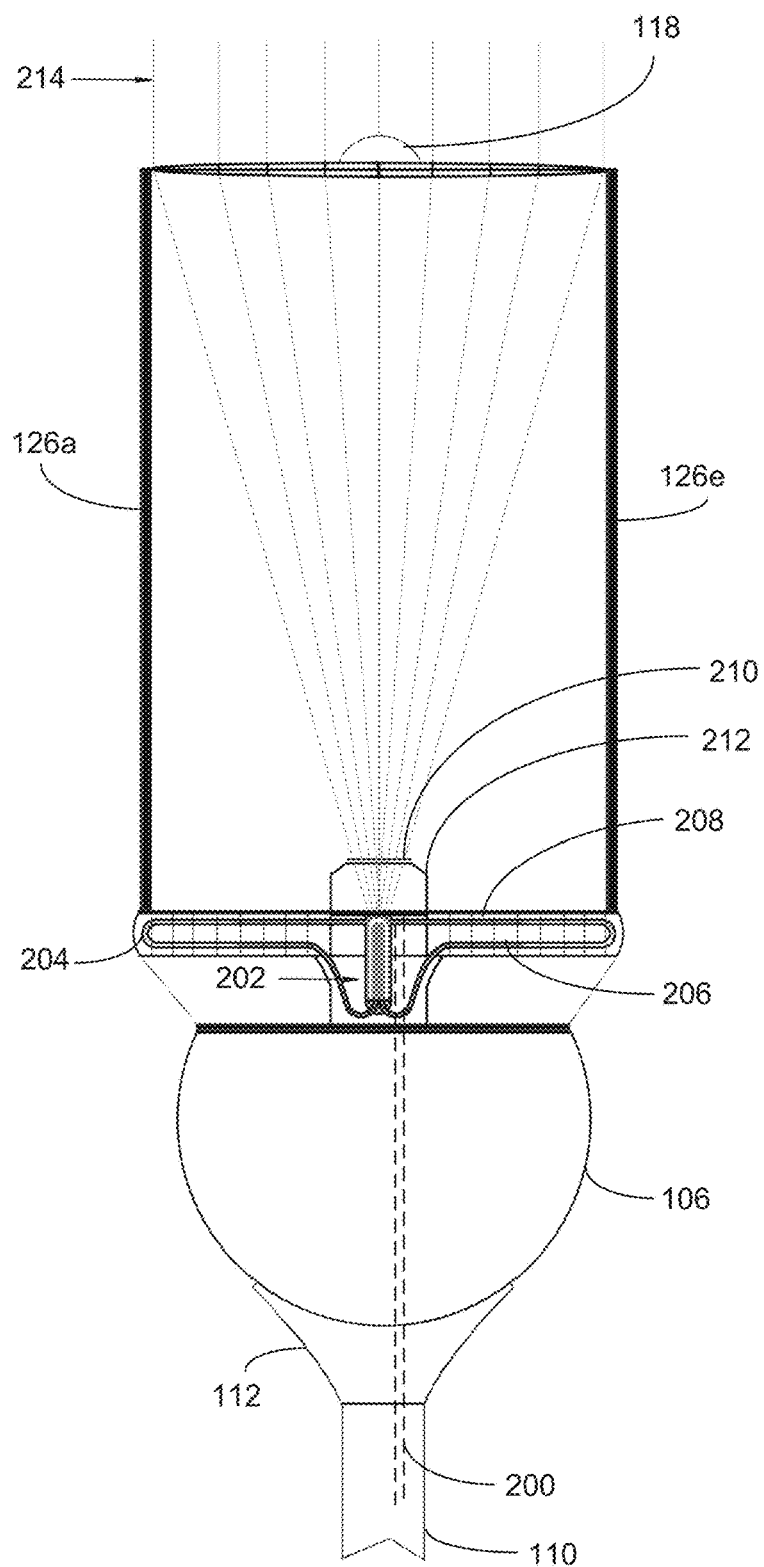
FIG. 3 illustrates a sectioned view of the articulating solar energy and wind power harvesting apparatus shown in FIG. 1, showing a heat exchange system and a cable for carrying generated electricity, in accordance with an embodiment of the present invention.

Turning now to FIG. 3, a solar thermal collector plate 208 is disposed on the base portion 102. Solar thermal collector plate captures solar radiation 214 for conversion to electricity. In one embodiment, solar thermal collector plate 208 comprises a solar panel 210. In some embodiments, solar panel 210 comprises multiple photovoltaic modules that use light energy (photons) from the sun to generate electricity through a photovoltaic effect. In another embodiment, the photovoltaic modules use wafer-based crystalline silicon cells or thin-film cells. Though in other embodiments, other configurations of solar panel 210 may be used.

In another embodiment, solar thermal collector plate 208 comprises a solar panel support member 212 adapted to support the solar panel 210 at a preset orientation. Solar panel support member 212 may include a block that holds solar panel 210 in an upright position. In this manner, solar thermal collector plate 208 is more effective in capturing solar radiation 214, and then converting the solar radiation 214 to electricity.

In some embodiments, a solar lens 118 is disposed in a parallel, spaced-apart relationship from the solar thermal collector plate 208. Solar lens 118 is sized and dimensioned to direct the solar radiation 214 towards the solar thermal collector plate 208. In one embodiment, multiple solar lenses may be used to optimize the focus of solar radiation 214 towards solar panel 210 in solar thermal collector plate 208.

Those skilled in the art will recognize that sunlight has two components, the "direct beam" that carries about 90% of the solar energy, and the "diffuse sunlight" that carries the remainder. As the majority of the energy is in the direct beam, maximizing collection requires the sun to be visible to the solar panel 210 for as long as possible. Thus the rotational and pivotal articulation of solar thermal collector plate 208 is effective for this purpose.

Figure 4:
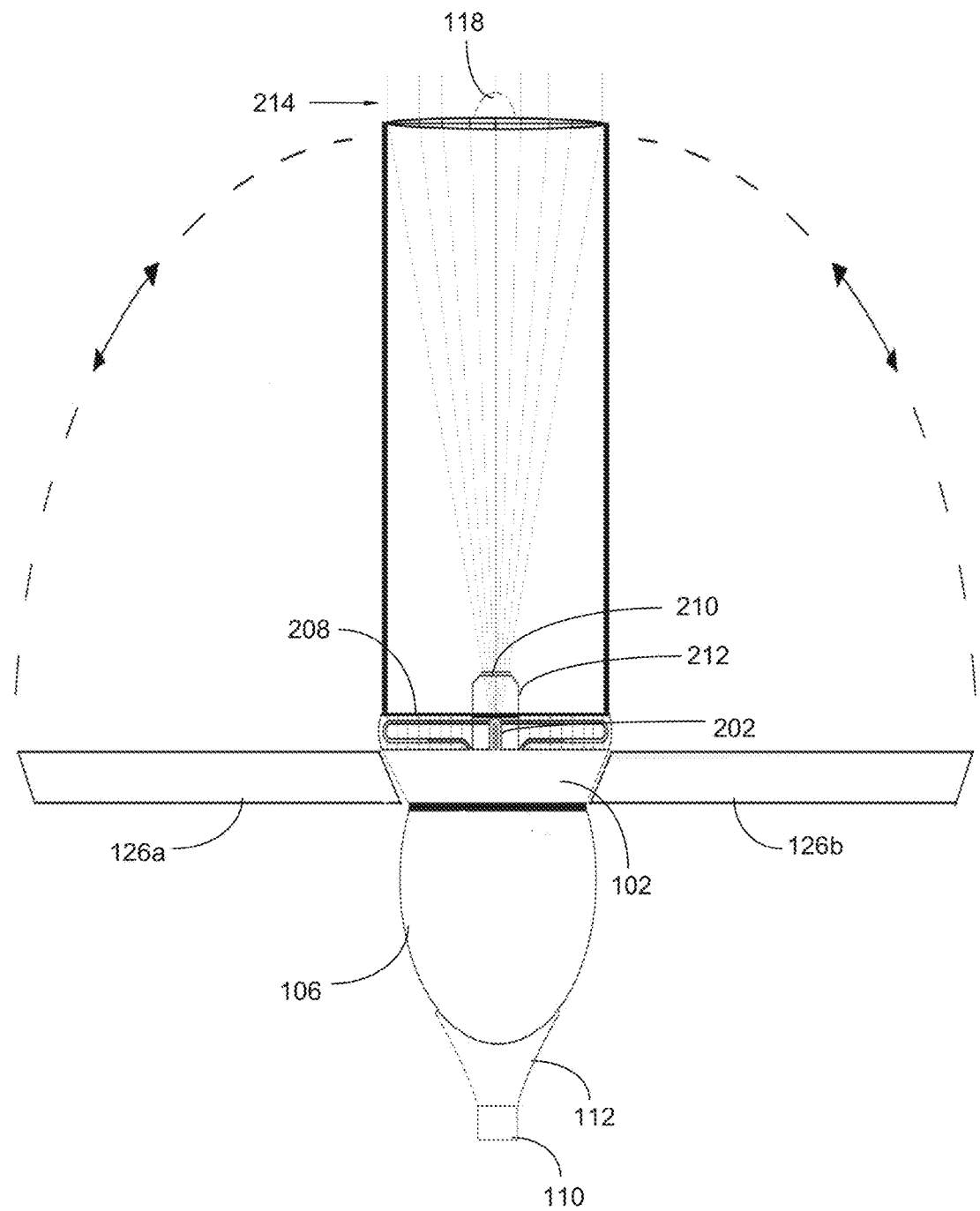
FIG. 4 illustrates a sectioned view of the articulating solar energy and wind power harvesting apparatus shown in FIG. 1, showing the air foils hingedly articulating 90°, in accordance with an embodiment of the present invention.

As FIG. 4 illustrates, apparatus 100 comprises a plurality of elongated air foils 126*a*, 126*b*, 126*c*, 126*d*, 126*e* configured to capture the wind 600 and be forcibly rotated by wind power for generating electricity. The air foils 126*a-e* rotate freely 360° in two directions to optimize harnessing of wind power. The wind forcibly rotates air foils 126*a-e* about the base portion 102 to create mechanical power with a connected generator 112. In one embodiment, generator 112 is a Sterling engine. Though in other embodiments, any electrical generating mechanism may be used. A cable 200 carries the generated electricity from the solar thermal collector plate 208 and the generator 112 for consumption. Cable 200 may include a wire adapted for direct current (DC) power.

Air foils 126*a-e* are defined by a proximal end 128*a* and a distal end 128*b*. Air foils 126*a-e* are disposed in a radial, spaced-apart relationship around the peripheral region 108 of the base portion 102, with proximal end 128*a* engaging base portion 102. In some embodiments, air foils 126*a-e* are angled at least 5° about a longitudinal air foil axis 400*c*. Though in other embodiments, other angles may be used. FIG. 5 illustrates a sectioned view of the articulating solar energy and wind power harvesting apparatus, showing longitudinal air foil axis about which air foil rotates. The angled configuration of the air foils 126*a-e* help optimize rotation and helps funnel the wind 600 towards the heat exchange system 202.

In one embodiment, a stabilizer ring 114 affixes to individual air foils 126*a-e* at the distal end 128*b* to hold the air foils 126*a-e* in a stable, upright, and parallel arrangement. This radial disposition arranges air foils 126*a-e* radially to encircle the solar thermal collector plate 208, which as discussed below, enables wind to be funneled towards the solar thermal collector plate 208. The radial arrangement of air foils 126*a-e* also optimizes rotation and directional funneling of wind towards solar thermal collector plate 208.

As illustrated in FIG. 5, the air foils 126*a-e* are hingedly connected to peripheral region 108 of base portion 102. Air foils 126*a-e* can be pivoted about peripheral region 108 up to 90° in an upward direction in relation to the panel 104 of the base portion 102. This pivotal articulation optimizes capture of the wind 600 to create wind power. As with ball joint 106, the mechanical controller may be used to control the pivotal articulation of the air foils 126*a-e*.

For example, the air foils 126*a-e* can be pivotally raised 90° in a vertical orientation to optimize capturing wind that is blowing in a generally perpendicularly direction to air foils 126*a-e*. But as the direction of the wind 600 changes and blows upwardly from base portion 102, towards the solar lens 118, the air foils 126*a-e* are pivoted downwardly to a 45° angle to optimize capture of the new direction of the wind 600. Thus, both solar thermal collector plate 208 and air foils 126*a-e* are controllably articulated up to 360° about the vertical plane 108a, and up to 180° about the horizontal plane 108b to optimize capture of solar radiation 214 and adapt to changing wind directions.

In some embodiments, a heat exchange system 202 is disposed adjacently to solar thermal collector plate 208. Heat exchange system 202 transfers heat from solar thermal collector plate 208 to the ambient air. In one non-limiting embodiment, heat exchange system 202 comprises a tube 204 and a heat exchange medium 206 flowing through the tube 204. Heat exchange medium 206 may include water or a fluid coolant known in the art of heat exchange.

In addition to rotating air foils 126-ae to generate electricity, the radial, angled arrangement of the air foils 126a-e is also configured for funneling wind towards the heat exchange system 202 and the solar thermal collector plate 208. After cooling the heat exchange system 202 and the solar thermal collector plate 208, the wind 216 is then allowed to flow freely outside the base portion 102, dissipating the heat in the process.

Figure 6:
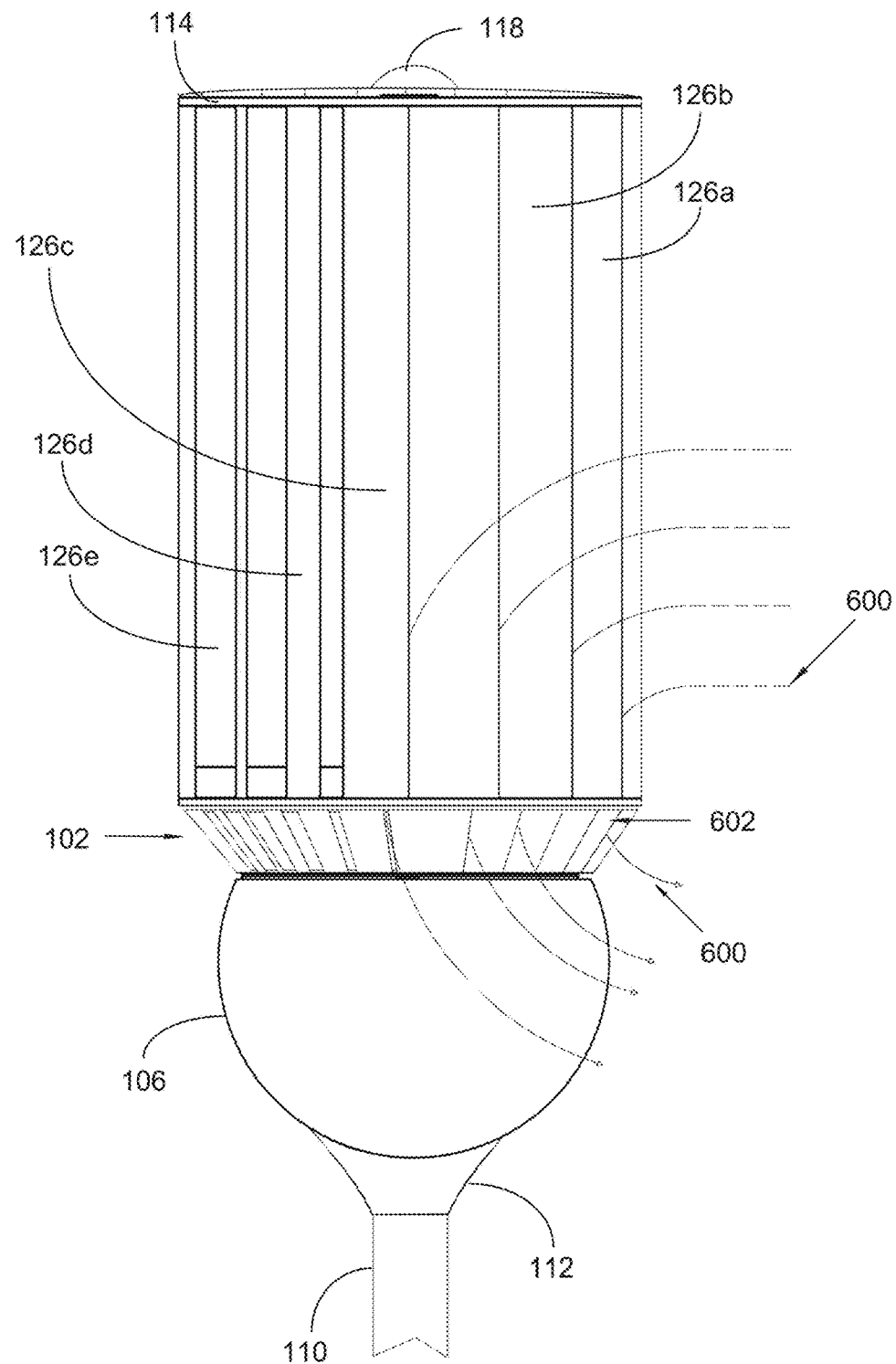
FIG. 6 illustrates a perspective view of the articulating solar energy and wind power harvesting apparatus shown in FIG. 1, showing wind passing through the air foils, and exiting through slots in the base portion, in accordance with an embodiment of the present invention.

FIG. 6 shows the wind 600 passing through the gaps between the air foils 126a-e, engaging the solar thermal collector plate 208, and exiting through slots 602 that from in base portion 102. Slots 602 provide passage for wind 600 to carry heat away from solar thermal collector plate 208 and the heat exchange system 202. This directionally funneled wind 600 serves to help cool the heat exchange medium 206. Thus, the air foils 126a-e serve the dual purpose of generating electricity, and cooling the solar thermal collector plate 208.

In essence, the present invention is configured to overcome technical, environmental, and geographic hurdles by combining solar and wind harnessing capabilities into one energy converting medium. The invention accomplishes this by utilizing a solar lens 118 to concentrate solar radiation 214 towards a solar thermal collector plate 208 while tracking the sun; and simultaneously capturing wind energy with articulating vertical air foils 126a-e adapted to follow the changing direction of the wind.

Further, the invention blends both physics models into a smaller footprint with the capability to double the electrical output by way of combining the harnessing power of both solar radiation 214 from the sun and wind 600. The invention converts the thermal energy transfer to electricity through utilization of a Sterling engine, and also uses the air foils 126a-e to cool the required heat transfer medium 206, all the while producing electricity from solar radiation 214 and wind power 216.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. An articulating solar energy and wind power harvesting apparatus, the apparatus comprising:
    a base portion defined by a panel and a peripheral region, the base portion being carried by a ball joint, the ball joint enabling rotational and pivotal articulation of the base portion up to 360° about a vertical plane, and up to 180° about a horizontal plane;
    a solar thermal collector plate disposed on the base portion, the solar thermal collector plate capturing solar radiation;
    a solar lens disposed in a parallel, spaced-apart relationship from the solar thermal collector plate, the solar lens directing the solar radiation towards the solar thermal collector plate;
    a heat exchange system disposed adjacently to the solar thermal collector plate, the heat exchange system transferring heat from the solar thermal collector plate to the ambient air;
    a plurality of air foils arranged around the peripheral region of the base portion in a radial relationship, the air foils being hingedly connected to the peripheral region of the base portion,
    whereby the air foils incrementally pivot up to 90° about the panel of the base portion,
    whereby the air foils are forcibly rotated about the base portion by the wind,
    whereby the air foils are shaped and dimensioned to help funnel the wind towards the heat exchange system; and
    a generator converting the mechanical power from the rotation of the air foils to electricity.

2. The apparatus of claim 1, wherein the base portion is defined by a generally annular shape.

3. The apparatus of claim 1, wherein the solar thermal collector plate comprises a solar panel, the solar panel converting the captured solar radiation to electricity.

4. The apparatus of claim 3, wherein the solar thermal collector plate comprises a solar panel support member adapted to support the solar panel at a preset orientation.

5. The apparatus of claim 1, wherein the air foils are defined by a proximal end and a distal end.

6. The apparatus of claim 1, wherein the base portion is defined by a plurality of slots.

7. The apparatus of claim 1, wherein the air foils rotate freely.

8. The apparatus of claim 1, wherein the air foils are arranged around the peripheral region of the base portion in an angled relationship.

9. The apparatus of claim 8, wherein the air foils are angled at least 5 degrees about a longitudinal air foil axis.

10. The apparatus of claim 9, wherein the angled configuration of the air foils help optimize rotation and helps funnel the wind towards the heat exchange system.

11. The apparatus of claim 1, further comprising a stabilizer ring attached to the distal end of the air foils.

12. The apparatus of claim 1, wherein the heat exchange system comprises a tube and a heat exchange medium flowing through the tube.

13. The apparatus of claim 1, wherein the generator comprises a sterling engine.

14. The apparatus of claim 1, further comprising a cable, the cable carrying the electricity from the solar thermal collector plate and the generator for consumption.

15. The apparatus of claim 1, further comprising a pole, the pole supporting the base portion.

16. An articulating solar energy and wind power harvesting apparatus, the apparatus comprising:
    a base portion defined by a panel, a peripheral region, and a plurality of slots, the base portion being carried by a ball joint, the ball joint enabling rotational and pivotal articulation of the base portion up to 360° about a vertical plane, and up to 180° about a horizontal plane;
    a solar thermal collector plate disposed on the base portion, the solar thermal collector plate capturing solar radiation and converting the solar radiation to electricity, the solar thermal collector plate comprising a solar panel and a solar panel support member adapted to support the solar panel at a preset orientation;

a solar lens disposed in a parallel, spaced-apart relationship from the solar thermal collector plate, the solar lens directing the solar radiation towards the solar thermal collector plate;

a heat exchange system disposed adjacently to the solar thermal collector plate, the heat exchange system transferring heat from the solar thermal collector plate to the ambient air;

a plurality of air foils arranged around the peripheral region of the base portion in a radial and angles relationship, the air foils being hingedly connected to the peripheral region of the base portion, whereby the air foils incrementally pivot up to 90° about the panel of the base portion, whereby the air foils are forcibly rotated about the base portion by the wind, whereby the air foils are shaped and dimensioned to help funnel the wind towards the heat exchange system;

a stabilizer ring attached to the distal end of the air foils; and a generator converting the mechanical power from the rotation of the air foils to electricity.

17. The apparatus of claim 16, wherein the air foils are angled at least 5 degrees about a longitudinal air foil axis.

18. The apparatus of claim 16, wherein the heat exchange system comprises a tube and a heat exchange medium flowing through the tube.

19. The apparatus of claim 16, further comprising a pole, the pole supporting the base portion.

20. An articulating solar energy and wind power harvesting apparatus, the apparatus consisting of:

a base portion defined by a panel, a peripheral region, and a plurality of slots, the base portion being carried by a ball joint, the ball joint enabling rotational and pivotal articulation of the base portion up to 360° about a vertical plane, and up to 180° about a horizontal plane;

a pole, the pole supporting the base portion;

a solar thermal collector plate disposed on the base portion, the solar thermal collector plate capturing solar radiation and converting the solar radiation to electricity, the solar thermal collector plate comprising a solar panel and a solar panel support member adapted to support the solar panel at a preset orientation;

a solar lens disposed in a parallel, spaced-apart relationship from the solar thermal collector plate, the solar lens directing the solar radiation towards the solar thermal collector plate;

a heat exchange system disposed adjacently to the solar thermal collector plate, the heat exchange system transferring heat from the solar thermal collector plate to the ambient air, the heat exchange system comprising a tube and a heat exchange medium flowing through the tube;

a plurality of air foils arranged around the peripheral region of the base portion in a radial relationship, the air foils being angled at least 5 degrees about a longitudinal air foil axis, the air foils being hingedly connected to the peripheral region of the base portion, whereby the air foils incrementally pivot up to 90° about the panel of the base portion, whereby the air foils are forcibly rotated about the base portion by the wind, whereby the air foils are shaped and dimensioned to help funnel the wind towards the heat exchange system;

a stabilizer ring attached to the distal end of the air foils; and a generator converting the mechanical power from the rotation of the air foils to electricity, the generator comprising a sterling engine.

* * * * *